J. D. CUNNINGHAM.
CAR COOLING DEVICE.
APPLICATION FILED JULY 22, 1908. RENEWED JUNE 2, 1911.
1,008,703.
Patented Nov. 14, 1911.
2 SHEETS—SHEET 2.
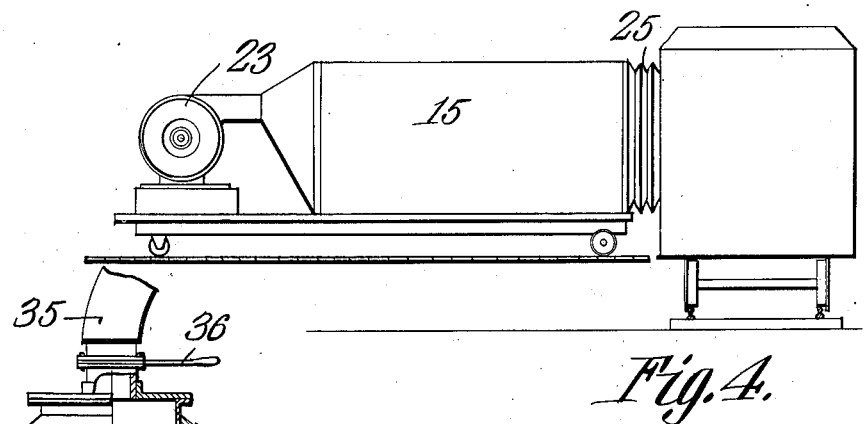
Fig. 4.
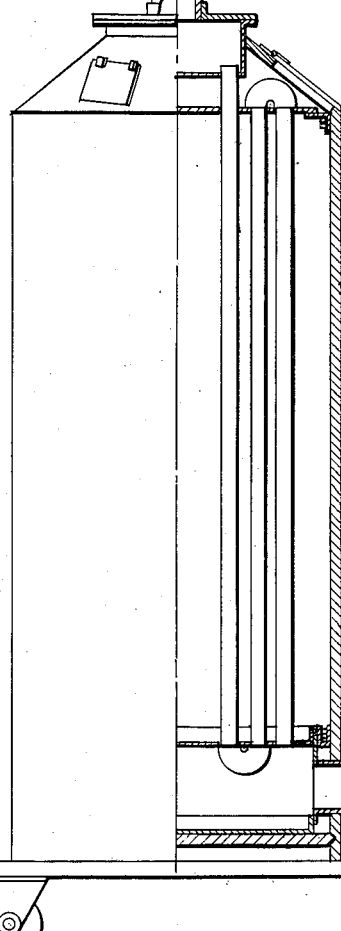
Fig. 5.
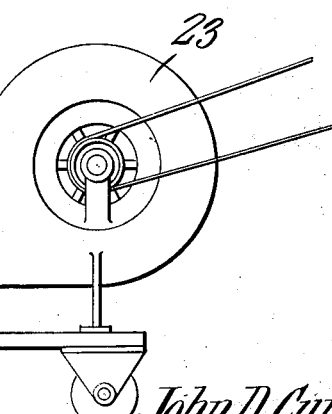
Witnesses
Inventor
John D. Cunningham.
By C. A. Snow & Co.
Attorneys

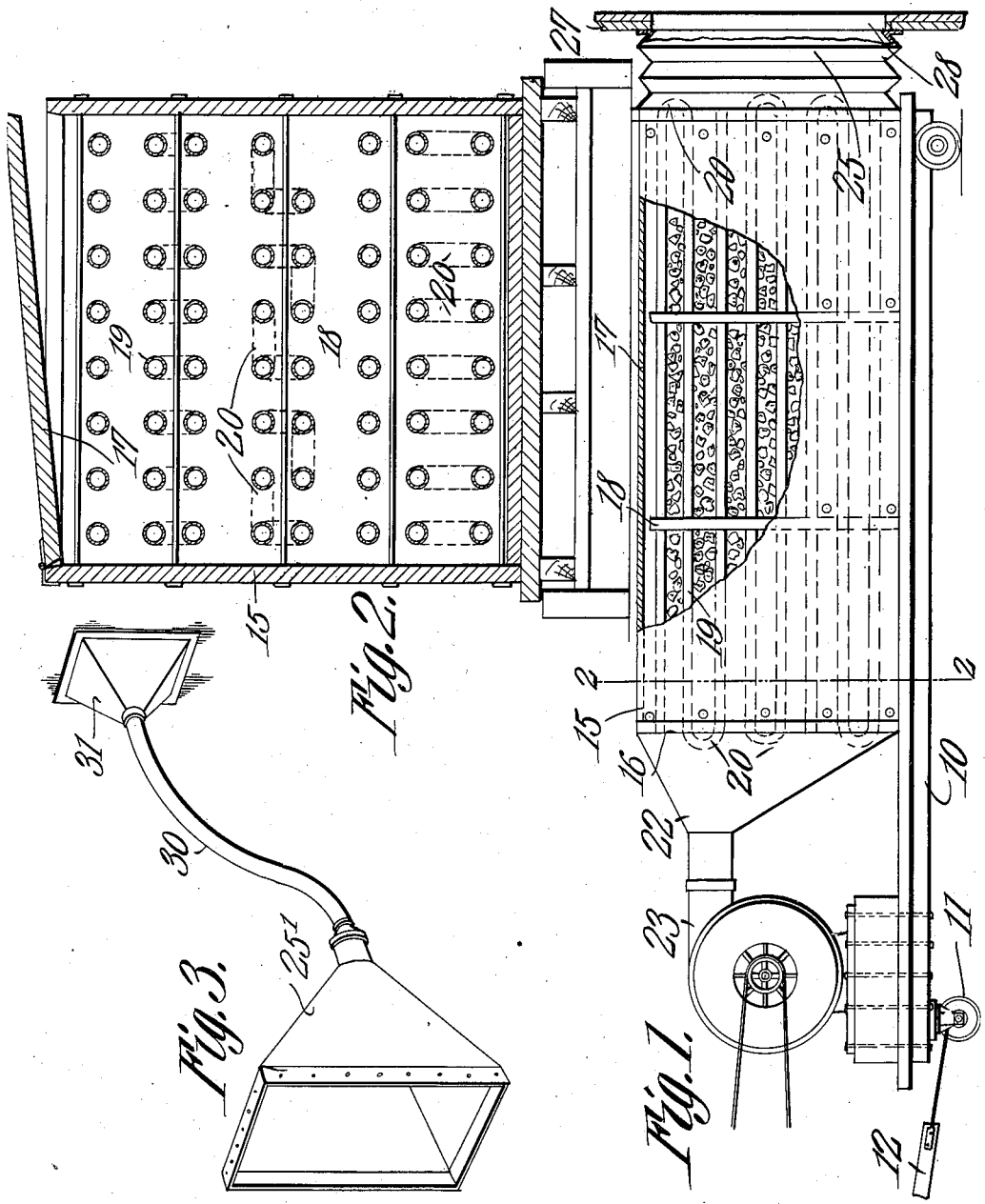

UNITED STATES PATENT OFFICE.

JOHN DANIEL CUNNINGHAM, OF MARIETTA, GEORGIA, ASSIGNOR, BY MESNE ASSIGN-
MENTS, TO THE BLIZZARD PRE-COOLER COMPANY, A CORPORATION OF OHIO.

CAR-COOLING DEVICE.

1,008,703.           Specification of Letters Patent.     Patented Nov. 14, 1911.

Application filed July 22, 1908, Serial No. 444,847. Renewed June 2, 1911. Serial No. 630,764.

*To all whom it may concern:*

Be it known that I, JOHN D. CUNNINGHAM, a citizen of the United States, residing at Marietta, in the county of Cobb and State of Georgia, have invented a new and useful Car-Cooling Device, of which the following is a specification.

In the transportation of fruits, vegetables and like perishable freight in refrigerator cars it is usual to place the freshly plucked fruit within the car either before or after the ice tanks are filled and then depend on the ice in the tanks to lower the temperature within the car and thus preserve the fruit until the car reaches its destination.

In the majority of cases the quantity of ice used is not sufficient to lower the temperature of a mass of fruit or other material to such point as to insure its preservation while the distribution of the air currents within the car is seldom such as to evaporate the moisture which forms on the fruit, and which is a frequent cause of decay. Unless the fruit is thoroughly chilled by the passage of currents of cold air and the moisture thoroughly evaporated it is impossible to maintain a very low temperature, no matter what quantity of ice be used in the tanks.

The principal object of the present invention is to provide what may be termed a preliminary cooler, which may be connected to the car immediately after the fruit is packed or at any desired point or points before the car reaches its destination, for the purpose of driving out all of the hot air and moisture and cooling the fruit down to such a temperature that it may be preserved in perfect condition by a comparatively small quantity of ice.

A further object of the invention is to provide a novel form of preliminary cooler which may be arranged at any point along the railway line and connected to the successive cars of a train by flexible tubing through which currents of cold air are driven, the tubing being connected to the cars at any desired point or points so as to displace the hot air by convection and lower the temperature to the desired point.

A still further object of the invention is to provide a preliminary cooler which may be of a portable type and mounted on wheels to permit ready transportation from place to place.

A still further object of the invention is to provide a cooling device which may be employed to advantage in hospitals, theaters or dwelling houses for the purpose of maintaining a low temperature during the summer months.

With these and other objects in view, as will more fully hereinafter appear, the invention consists in certain novel features of construction and arrangement of parts, hereinafter fully described, illustrated in the accompanying drawings, and particularly pointed out in the appended claims, it being understood, that various changes in the form, proportions, size and minor details of the structure may be made without departing from the spirit or sacrificing any of the advantages of the invention.

In the accompanying drawings:—Figure 1 is a side elevation of an air cooling device constructed in accordance with the invention, a portion of the outer casing being broken away in order to show the inner air tube. Fig. 2 is a transverse sectional view of the same on the line 2—2 of Fig. 1, drawn to an enlarged scale. Fig. 3 is a detail perspective view showing an adjustable discharge connection which may be applied to the end of the cooler to conduct the air current to different points in the car. Fig. 4 is a view in the nature of a diagram showing the cooler connected to a car. Fig. 5 is an elevation, partly in section, of a modified form of cooler.

Similar numerals of reference are employed to indicate corresponding parts throughout the several figures of the drawings.

The air cooler forming the subject of the present invention is mounted on a suitable truck 10 having supporting wheels 11 and provided at one end with a tongue or handle 12 by which the cooler may be readily moved from place to place.

On the platform of the truck is arranged a tank 15 which may be constructed of wood or other material. The tank is provided with end members 16 and a hinged lid or cover 17 and at suitable points within the tank are transversely disposed partitions 18 divided into a number of compartments.

The end walls 16 and partitions 18 serve for the support of air cooling pipes 19 which may be provided with suitable return bends 20 of any number in order that the air entering at one end may be cooled to any desired temperature.

The pipes are arranged in sets, each set extending back and forth in the casing, and having an inlet at one end thereof, and an outlet at the opposite end.

The coils are arranged in three tiers. In the upper and lower tiers, each coil consists of three horizontal pipes connected by two return bends, the upper member opening into the hood 22, and the lower member discharging into the chamber 25. The middle tier of each coil also consists of three horizontal pipes connected by return bends, but these pipes are arranged in two rows only, the return bends being fitted on the pipes accordingly.

The return bends are on the outside of the end walls 16 which enables the air-conducting pipes to be supported by said walls. Each pipe is therefore given a firm support, and a rigid structure is had, which is desirable as the apparatus is not a stationary one, but is portable, and when in use is frequently shifted about.

The various compartments of the tank are filled with any suitable refrigerant, such for instance, as a mixture of cracked ice and salt, or the air pipes may be surrounded by ammonia expansion pipes or by pipes for the circulation of a cold brine or other liquid.

At one end of the tank is secured a hood 22 that is connected to the discharge pipe of a blast fan 23, which may be driven from any suitable source of power, and the air entering this hood is distributed through the several pipes 19 and after flowing through the pipe is discharged at a much lower temperature into a compartment 25 at the opposite end of the tank.

The discharge compartment 25 is provided with extensible walls that preferably are constructed in the same manner as an ordinary camera bellows. At the outer ends of the walls is secured a plate 27 that is arranged to fit closely against the side wall of the car, said plate having a central opening 28 of an area somewhat less than the area of one of the doors of the car.

The air cooler may be wheeled in position and the plate 27 adjusted against the open side of the car after the latter has been filled with fruit, the bellows like walls of the discharge compartment yielding so that the plate 27 may be thrust closely against the side of the car to prevent leakage of air. The fan is then started into operation and air is forced through the several pipes 19, the cold air being discharged into the car and serving to evaporate the moisture and at the same time to drive out all of the heated air within the same so that the temperature will be rapidly reduced to the desired point. This low temperature will then be safely maintained by a comparatively small quantity of ice in the ordinary tanks and the fruit will arrive at its destination in perfect condition.

Where exceptionally long distances must be traveled, or where the cars are delayed in transport, they may be connected to coolers at intermediate points for the purpose of reducing the temperature one or more times before the load is discharged.

In some cases it may not be possible or desirable to blow the cold air directly through the side doors of the car, and in such cases the bellows discharge chamber 25 is removed and a discharge chamber 25' is substituted therefor.

The discharge chamber 25' is in the form of a tapering hood, the smaller end of which is connected by a flexible tube 30 to a small casing 31 that may be connected to one of the end doors of the car or to a top door or other point through which air may be forced to the interior.

In Fig. 5 is illustrated a slightly modified construction of the cooler. In this case the cooling tank 15' is vertical and the air cooling pipes are, also, vertical. The air is forced in at the bottom and is discharged at the top through a tube 35 and the discharge of air may be regulated by a suitable damper or valve 36.

While the apparatus has been described in its portable form as representing the most simple construction, it is obvious, of course, that large plants may be installed permanently at railway stations or at any point or points along the railway line and connected to the successive cars of a train by flexible tubing, it being possible to treat an ordinary car and secure the desired reduction of temperature within a very few minutes.

Where the apparatus is used in connection with the cooling of hospitals, theaters or dwelling houses the apparatus may be connected to the radiator or similar pipes, usually found in such places, and a circulation of cold air maintained in said pipes in place of the steam or hot water employed during the winter months, and in this way the temperature of the rooms of the building may be lowered in the summer in practically the same way as they are heated in the winter.

As before stated, it is possible to employ any refrigerating agent for the purpose of cooling the air and this may be possible at large distributing points where suitable refrigerating machinery may be profitably employed. In such cases the air pipes may be surrounded by other pipes maintaining a cold brine solution, or a fluid that will act to absorb the heat of the air.

What is claimed is:—

1. An air cooling apparatus comprising a wheeled platform, a casing mounted thereon and provided with a plurality of intermediate partitions dividing the casing into compartments, a lid or cover for the top of the casing, a plurality of tubes extending through the end walls and partitions and provided with return bends, a blast fan mounted on the platform, a tapered hood secured to one end of the casing and forming a connection between the discharge side of the blast fan and the inlet ends of the tubes, a discharge chamber having flexible walls secured to the discharge end of the casing, and a plate arranged to rest against the side of the car to be treated, said plate being secured to the flexible wall of the discharge chamber, and having an opening through which the cold air may pass.

2. An air-cooling apparatus comprising a closed casing containing a refrigerant, a plurality of tubes therein extending through the end walls thereof, and provided on the outside thereof with return bends, said tubes being arranged in sets, and each set extending back and forth in the casing, and having an inlet at one end thereof, and an outlet at the opposite end, a casing over the inlet ends of the tubes, a fan discharging into the last-mentioned casing, a casing over the outlet ends of the tubes, and means for delivering the air from the last-mentioned casing.

3. An air-cooling apparatus comprising a closed casing containing a refrigerant, a plurality of tubes therein extending through the end walls thereof, and provided on the outside thereof with return bends, said tubes extending back and forth in the casing, and having an inlet at one end thereof, and an outlet at the opposite end, a casing over the inlet ends of the tubes, a fan discharging into the last-mentioned casing, a casing over the outlet ends of the tubes, and means for delivering the air from the last mentioned casing.

4. A portable air cooling apparatus comprising a truck, a closed casing mounted on the truck, and containing a refrigerant, a plurality of tubes in the casing extending through the end walls thereof, and provided with return bends, said tubes being arranged in sets, each set extending back and forth in the casing, and having an inlet at one end thereof, and an outlet at the opposite end, a casing over the inlet ends of the tubes, a fan discharging into the last mentioned casing, a casing over the outlet ends of the tubes, and means for delivering the air from the last mentioned casing.

In testimony that I claim the foregoing as my own, I have hereunto affixed my signature in the presence of two witnesses.

JOHN DANIEL CUNNINGHAM.

Witnesses:
CHARLES STREETMAN,
GLENDINNING B. GROESBECK.